United States Patent [19]
Goering

[11] 3,876,019
[45] Apr. 8, 1975

[54] CONTROL FOR STEERING, SPEED AND DIRECTION

[75] Inventor: Lowell J. Goering, Moundridge, Kans.

[73] Assignee: Hesston Corporation, Hesston, Kans.

[22] Filed: June 12, 1973

[21] Appl. No.: 369,249

[52] U.S. Cl................................. 180/6.48; 74/471 R
[51] Int. Cl............................................ B62d 11/04
[58] Field of Search.................. 180/6.48, 6.3, 77 H; 74/471 R

[56] References Cited
UNITED STATES PATENTS

| | | | |
|---|---|---|---|
| 2,941,609 | 6/1960 | Bowers et al. | 180/6.48 |
| 3,161,245 | 12/1964 | Thoma | 180/6.48 |
| 3,461,669 | 8/1969 | Kanengieter | 180/6.48 UX |

Primary Examiner—David Schonberg
Assistant Examiner—John A. Pekar
Attorney, Agent, or Firm—Schmidt, Johnson, Hovey & Williams

[57] ABSTRACT

A hydraulic steering, speed, and direction control uses a steering wheel and a separate speed/direction lever which may be operated independently of and without affecting one another. A special control assembly, where the steering wheel and lever are coupled with the same actuators for the hydraulic parts of the control, has a pair of chain-guide plates of substantially the same diameter so that swinging of one of the plates to effect speed and direction control does not cause peripheral travel of the chain entrained about the plates and used to effect steering control. A yieldable connector between the speed/direction lever and the assembly permits full speed turns during forward travel without retracting the lever from its full speed forward position.

12 Claims, 10 Drawing Figures 3,876,019

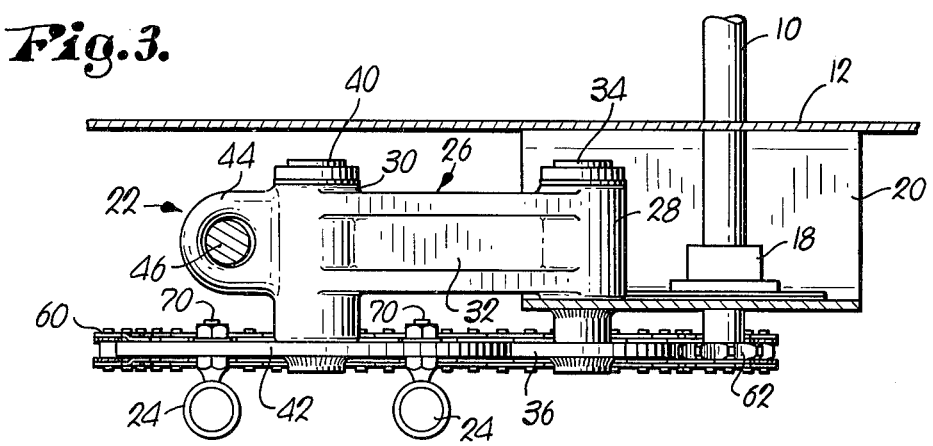
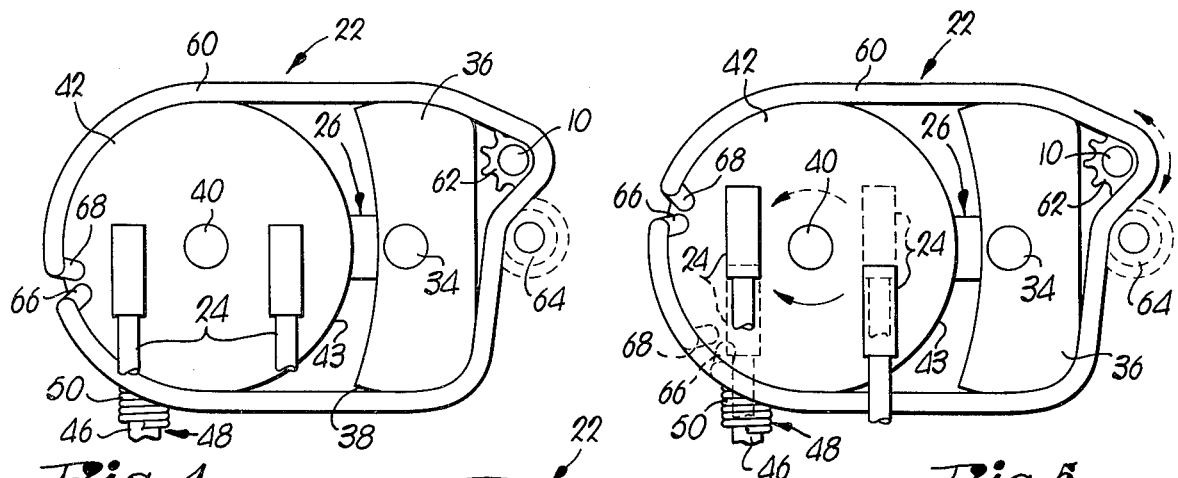
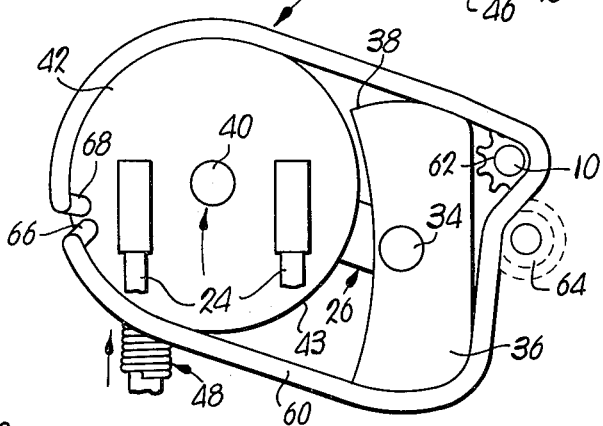
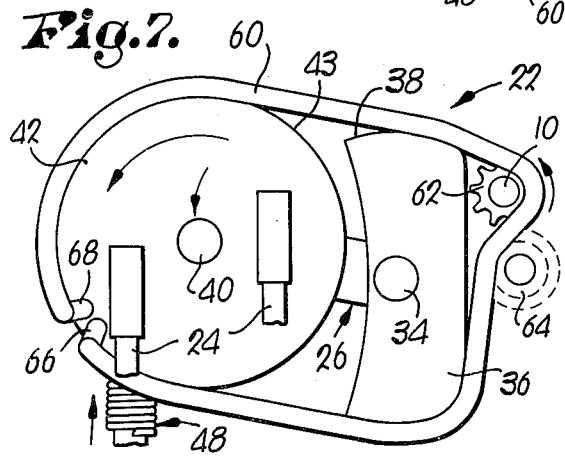
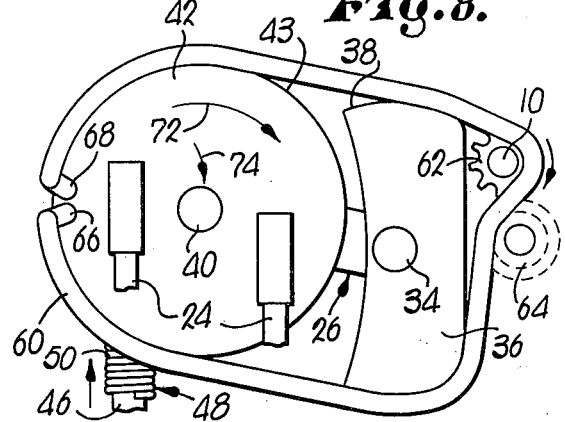

CONTROL FOR STEERING, SPEED AND DIRECTION

This invention relates to improvements in a vehicular speed, steering, and direction control mechanism wherein the rotative speed of a drive wheel on one side of the vehicle relative to that of a drive wheel on the opposite side of the vehicle determines whether the vehicle will move in a straight line or turn toward one side or the other during advancement. In lieu of various linkages, rods, and cranks to turn the wheels inwardly or outwardly in order to make a turn as in many conventional steering systems, in the present type of system the drive wheels are never turned inwardly or outwardly but instead are only speeded up or slowed down relative to one another to cause turning of the vehicle toward the side having the slower wheel. When both wheels are driven at the same speed, in either forward or reverse, the vehicle travels in a straight line.

This type of vehicle control normally employs hydraulic motors at opposite drive wheels of the vehicle that are supplied hydraulic fluid in variable amounts and in either of two opposite directions so as to drive the wheels in the manner selected by the operator. Each motor, in turn, has its own variable displacement pump, operated by the prime mover of the vehicle, that supplies fluid to the motor in the selected direction and in the selected amount.

Various arrangements have heretofore been provided for operating the variable displacement pumps from the operating cab, including a "joy stick" wherein the operator controlled all three major functions (speed, steering, and direction) through the single instrumentality of the joy stick. When the stick was pushed forwardly, the vehicle would move forwardly at a speed determined by the forward position of the stick and, conversely, when the stick was pulled rearwardly, the vehicle would move in reverse at a speed determined by the rearward position of the stick. Turning of the vehicle was effected by swinging the stick toward the left or right of its normally centered position.

One patent disclosing this type of control is U.S. Pat. No. 3,528,519 to Case of Sept. 15, 1970, and because this patent shows certain aspects of a typical control such as drive wheels, hydraulic motors, variable displacement pumps and pump actuating structures not detailed in the present disclosure, the said patent is hereby incorporated by reference into the present disclosure as need be for a full and clear understanding of the control of the present invention. While the control illustrated in this patent has proven to be highly successful and fully operational, the "joy stick" principle which it embodies might be viewed with disfavor by those who would prefer a more "natural" arrangement wherein steering is accomplished by a steering wheel while direction and speed are accomplished by other means separate and apart from the steering wheel. Accordingly, one important object of the present invention is to provide an alternative to the "joy stick" control such as disclosed in said patent by presenting a control mechanism which is especially suited for using a more "natural" steering wheel and separately operated speed control, all the while employing a hydraulic motor and variable displacement pump arrangement such as disclosed in said patent.

Another important object of the instant invention is the provision of a hydraulic speed, steering and direction control which utilizes a steering wheel separate and apart from the speed and direction actuator, yet which, even though coupled to the same hydraulic control system, is capable of carrying out the steering function totally without influence on the speed and direction function, and vice versa.

A further important object of this invention is to provide a control wherein the steering ratio may be varied substantially with a minimum of structural change and without affecting the capability of the control to carry out its speed, steering and direction functions.

An additional important object of the instant invention is to provide a control wherein even though the speed actuating lever may be at its full forward throttle position, the steering wheel may still be turned to cause displacement of different amounts of fluid to the drive wheels without retracting the speed lever from said full forward throttle position.

In the drawings:

FIG. 3 is a vertical cross sectional view of the mechanism taken along line 3—3 of FIG. 1;

FIG. 4 is a schematic, bottom plan view of the mechanism on a reduced scale showing the mechanism in neutral;

FIG. 5 is a view similar to FIG. 4 illustrating the manner in which the mechanism is actuated for turning;

FIG. 6 shows the mechanism in a full forward condition for straight line travel;

FIG. 7 shows the mechanism in condition for full speed forward travel and a right turn;

FIG. 8 shows the mechanism in condition for full speed forward travel and a left turn;

FIG. 9 illustrates the mechanism in the same condition as FIG. 8, but viewed from the top thereof; and FIG. 10 is a schematic, bottom plan view of the mechaism in a full speed reverse position.

Figure 1:
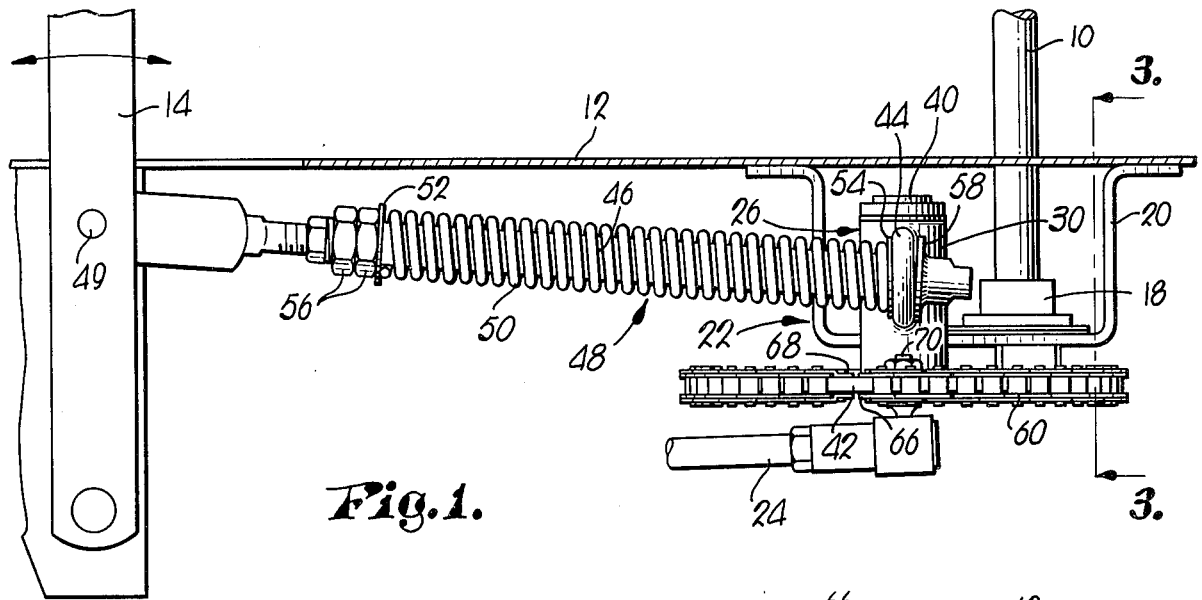
FIG. 1 is a fragmentary elevational view of control mechanism embodying the principles of this invention.
Figure 2:
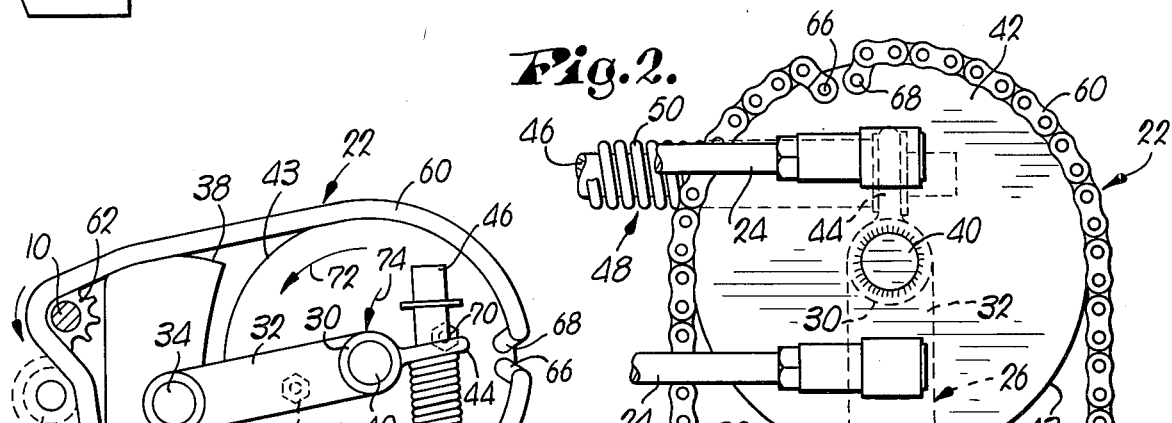
FIG. 2 is a fragmentary, bottom plan view of the mechanism.

Viewing initially FIGS. 1, 2 and 3, the control mechanism of the present invention includes an upright shaft device 10 projecting through the floor 12 of the operating cab area of the vehicle for supporting a steering wheel (not shown) used to turn the vehicle or maintain the same in a straight line. A speed and direction control lever element 14 is pivotally mounted on a bracket 16 below floor 12 for swinging movement generally toward and away from shaft 10 for controlling both the speed of advancement of the vehicle and the direction of advancement. Preferably the steering shaft 10 is disposed forwardly of lever 14 with the latter disposed to the right side of the cab area as viewed by the operator, a forward push on lever 14 causing forward travel and a rearward pull causing travel in reverse.

Shaft 10 is journaled by bearings 18, in turn supported by a generally U-shaped bracket 20 suspended from floor 12. An assembly broadly designated by the numeral 22 and also located beneath floor 12 serves to couple the steering wheel shaft 10 and the speed/direction lever 14 with actuating rod structures 24 that lead to the variable displacement control pumps at the rear of the vehicle as discussed above and as disclosed in the incorporated patent. In view of the full disclosure in said patent of the precise nature of the control pumps, the hydraulic motors and their associated drive wheels, suffice it to point that each actuating rod 24 controls its pump by pushing or pulling on a swingable valve component of the pump. Thus, the amount of fluid displaced by the respective pumps and the direction of flow therefrom depends upon the longitudinal position of the rods 24, and it is this positioning that the assembly 22 controls.

Included in the assembly 22 is a swingable unit 26 having a pair of hubs 28 and 30 interconnected by an arm 32, the inner hub 28 having a central pivot shaft 34 which extends downwardly through the floor to bracket 20 and is welded to the bottom face of said floor to adapt the casting 26 for swinging movement about the axis of shaft 34. Welded to that portion of shaft 34 extending below bracket 20 is a somewhat crescent-shaped plate member 36 having a pair of opposed, arcuate peripheral edges 38 concentric with shaft 34.

The outer hub 30 of unit 36 rotatably carries its own upright pivot shaft 40 that passes entirely through hub 30 and is welded to a circular disc member 42 at the bottom of hub 30 having an arcuate peripheral edge 43 and disposed in the same horizontal plane as plate 36. By virtue of the rotatability of shaft 40 within outer hub 30, the disc 42 is rotatable relative to unit 26 about an upright axis through shaft 40, and by virtue of the swingability of unit 26 about shaft 34, disc 42 is swingable along an arcuate path of travel concentric with shaft 34. An annular ear 44 projecting laterally outwardly from outer hub 30 slidably receives a rod 46 of a yieldable connector 48 pivotally joining the lever 14 with unit 26, the rod 46 being pivoted to lever 14 at 49.

The connector 48 includes, in addition to rod 46, a coil spring 50 that encircles rod 46 and is captured between a pair of opposed washers 52 and 54, the washer 54 abutting ear 44 and the washer 52 abutting a pair of spring compression adjusting nuts 56 on the opposite, threaded end of rod 46. A fixed washer 58 on rod 46 abuts the opposite face of ear 44.

The disc 42 and the plate 36 are of substantially the same diameter and are entrained by a flexible, link drive chain 60 that also entrains a small sprocket component 62 fixed to steering wheel shaft 10, there being an idler sprocket 64 supported by bracket 20 in mesh with chain 60 adjacent sprocket 62. Opposite ends of the chain 60 are anchored to the disc 42 at 66 and 68 so that rotation of the sprocket 62 causes corresponding rotation of disc 42.

The actuating rods 24 are pivotally connected to disc 42 in diametrically opposed relationship on opposite sides of shaft 40 through fasteners 70, their points of connection being equally spaced from shaft 40 and being so selected that they will be in line with the axes of shafts 34 and 40 when the assembly 22 is in a neutral condition as shown in FIG. 2 without forward or reverse driving and without turning to either side.

The operation of the mechanism can best be understood by referring to the schematic representations of assembly 22 in its various operative positions as illustrated in the bottom views of FIGS. 4–8 and 10, and the top view of FIG. 9. As shown in FIG. 4, when the assembly 22 is completely in neutral, the axes of shafts 40 and 34 as well as the fasteners 70 of rods 24 are all in alignment with one another as shown. A clockwise turn (viewing FIG. 5) of the steering wheel shaft 10 (left turn of the vehicle) causes the chain 60 to travel a corresponding amount in the same direction as shaft 10 so that the disc 42 also rotates clockwise and rods 24 are displaced longitudinally relative to one another in opposite directions as shown in solid lines in FIG. 5. This opposite but equal displacement of rods 24 means that the control valves of the pumps for the hydraulic motors of the vehicle are shifted equally but in opposite directions to cause a corresponding fluid flow to the hydraulic motors. Because of the equal but opposite flow to the motors, the vehicle turns in a tight circle without any effective forward advancement. From the operator's viewpoint, such circle will be in a leftward or counterclockwise direction.

If the steering wheel shaft 10 is rotated counterclockwise viewing FIG. 5 (clockwise from the operator's viewpoint for a rightward turn), the respective pieces of assembly 22 assume their dashed line positions of FIG. 5 because of the travel of chain 60 in the opposite direction from that of the preceding paragraph. With the rods 24 displaced oppositely to that previously caused for a leftward turn of the vehicle, the control pumps are so actuated to cause the right wheel of the vehicle to rotate in reverse while the left wheel thereof rotates forwardly, hence causing a tight clockwise circle from the operator's viewpoint.

Now, assuming that the operator wishes to drive the vehicle forwardly in a straight line without deviating from side to side, he shifts lever 14 forwardly to correspondingly swing unit 26 and disc 42 as shown in FIG. 6. The rods 24 are thereby pulled in unison and by equal amounts so that precisely the same amount of hydraulic fluid is displaced to the opposite motors of the drive wheels, hence driving both wheels in the same forward direction and at the same speed to advance the vehicle in a straight line. Travel in the reverse direction is provided by swinging lever 14 rearwardly from the neutral position shown in FIG. 1 so that rods 24 are displaced rearwardly, in unison, and in equal amounts as shown in FIG. 10. This drives both wheels in reverse at exactly the same speed so that the vehicle backs up in a straight line.

At this juncture, the importance of the plate 36 and its relationship to disc 42 should be understood. Using a full forward speed as an example, note in FIG. 6 that even through the disc 42 has been swung substantially forwardly from its neutral position of FIG. 4, the chain 60 has not been forced to travel in its loop along the edges 38 of plate 36, which would pull the disc 42 around relative to plate 36 and displace the rods 24 relative to one another. While it might at first be expected that rods 24 would be shifted relative to one another because of the variance in their respective distances from the point of swinging of disc 42 about shaft 34,. such is not the case because of the existance of plate 36 and the fact that it is of substantially the same diameter as disc 42. Thus, when disc 42 swings, precisely the same amount of chain 60 wraps and unwraps (without travel in the chain itself) from plate 36 as from disc 42, and the latter is rotated counterclockwise relative to shaft 40 an amount that causes disc 42 to remain in the same rotative attitude with respect to plate 36. None of the links of chain 60 is moved along edges 38 of plate 36 or edges 43 of disc 42. Therefore, the rods 24 are displaced precisely the same amount, and the steering wheel shaft 10 is not rotated to any extent whatsoever. Hence, the line followed by the vehicle is perfectly straight without deviation to one side.

Similarly, when the vehicle is turned toward one side or the other as shown in FIG. 5, the presence of the specially sized plate 36 is again important because no swinging of disc 42 is caused when chain 60 is driven by shaft 10. The linear stretches of chain 60 between disc 42 and plate 36 remain parallel to each other at all times, hence not forcing disc 42 to swing when chain 60 is pulled by shaft 10. Therefore, the rods 24 can be shifted in either of two opposite directions without effecting any swinging at all of disc 42, completely isolating the steering function of the vehicle from the speed/-direction function thereof.

The specially sized plate 36 is further important because of the fact that it gives a great degree of flexibility as to the steering ratio which will be imparted to the steering wheel shaft 10. In this regard, note that the effect on chain 60 by disc 42 when the latter is swung forwardly as in FIG. 6 or rearwardly as in FIG. 10 is precisely the same regardless of the specific size selected for sprocket 62 on steering wheel shaft 10. Thus, if a relatively high steering ratio is desired, it is but necessary to provide shaft 10 with a relatively small sprocket 62 so that a large rotative displacement of shaft 10 results in only a small amount of travel of chain 60. On the other hand, if a lower steering ratio is desired, it is only necessary to select an appropriately larger sized sprocket 62 so that the rotation of shaft 10 more closely approaches an equivalent displacement of the chain 60.

FIGS. 7, 8, and 9 show the assembly 22 during full speed forward travel and either a right or left turn. The swinging of disc 42 and its rotation by chain 60 is the same as that described with reference to FIGS. 5 and 6, although here the swinging and rotation take place in combination with one another, rather than separately. Again, the specially sized plate 36 prevents swinging of disc 42 from causing travel of chain 60 along edges 38 and prevents rotation of steering wheel shaft 10 from causing swinging of disc 42. Hence, the vehicle turns exactly to the extent anticipated by the operator as he rotates the steering wheel and, similarly, the vehicle advances at precisely the speed the operator expects it to travel as determined by the selected position of lever 14.

The full speed forward turns illustrated in FIGS. 7, 8 and 9 may be carried out without retracting the lever 14 from its full forward position through the provision of the yieldable connector 48. When the assembly 22 is in its full forward condition without turning, as illustrated in FIG. 6, lever 14 is also fully forward as are the rods 24. Therefore, there is no further room for either of the rods 24 to be displaced forwardly with respect to the other rod 24 in order to effect a turn of the vehicle, and if the connector 48 were simply a rigid connection, the operator would be unable to turn the steering wheel without first retracting lever 14 a sufficient extent to allow the rods 24 to be displaced relatively fore-and-aft of one another. However, by virtue of spring 50 in association with the rod 48 therethrough, the operator need not worry about the position of lever 14 during high speed forward turns because, as shown in FIG. 9, the spring 50 is simply compressed by ear 44 as the casting 26 is pulled back toward the neutral position thereof by chain 60 a sufficient extent to allow one of the rods 24 to remain in its full forward position while the other rod 24 is displaced rearwardly.

By way of example, suppose that the vehicle is moving at a full forward speed in a straight line such as would be the case with assembly 22 in its FIG. 6 condition. Note that the anchor points 66 and 68 are approximately in an 8 o'clock position at this time and spring 50 is in its normal, slightly compressed state. Then, as the operator makes a left turn as illustrated in FIGS. 8 and 9 the chain 60 rotates disc 42 in the direction of the large arrow 72 so that the anchor points 66 and 68 are moved around to the approximately 9 o'clock position. However, such rotation of disc 42 is resisted by the left rod 24 (viewing FIG. 8) because it is at its full forward limit, and hence pulling of the chain 60 actually causes the casting 26 to swing back toward neutral in the direction shown by the small arrow 74 in order to accommodate the rotation of disc 42. Because the rod 46 of connector 48 is pushed fully forwardly by lever 14 at this time, spring 50 must compress further as shown in FIG. 9 in order to accommodate the rearward swinging of casting 26, which in turn allows the right rod 24 (viewing FIG. 8) to be displaced rearwardly a sufficient extent to create a differential in the amount of fluid supplied to the drive wheels of the vehicle. In effect, the disc 42 revolves eccentrically during high speed forward turns about an axis located at the fastener 70 associated with that rod 24 which remains fully forward during the turn.

The special connector 48 of course accommodates the high speed turning conditions in both directions, left or right, and thereby greatly facilitates control of the vehicle at this crucial time. Instead of coordinating the steering wheel and speed lever 14 during the high speed forward turns, the operator can devote his full attention to turning the wheel to the extent necessary while disregarding completely the speed/direction lever. Operating safety is thereby increased, and the skill and practice required to operate the vehicle is significantly reduced.

It will be appreciated that while the spring-loaded connector 48 allows the operator to turn steering shaft 10 in either direction at full forward speed without retracting lever 14, such full speed turns cannot be made when the vehicle is traveling in reverse, for reasons of safety. Note from FIG. 10 in conjunction with FIG. 1 that when rods 24 and lever 14 are at their rearmost limits, the washer 58 of connector 48 is pulled tightly against the forward side of ear 44 by rod 46. Because rod 46 is non-extensible, unit 26 can only swing forwardly when lever 14 is swung forwardly, and hence neither of the rods 24 can be displaced forwardly relative to the other from their rearmost limits when lever 14 is held in its rearmost position. Before the operator can make a turn from the full reverse speed, he must first slow down a sufficient extent by pushing lever 14 forwardly to allow rods 24 to be relatively displaced, thereby preventing the operator from turning in reverse at a faster speed than he can safely handle.

Having thus described the invention, what is claimed as new and desired to be secured by Letters Patent of the United States is:

1. In a vehicle having a pair of wheels, a hydraulic motor for driving each wheel respectively, and a variable displacement pump for each motor respectively, each pump having shiftable actuating structure for increasing or decreasing the flow of fluid to its motor in either of two opposite directions, control mechanism for said structures comprising:

a rotatable steering device actuable by the operator of the vehicle for turning the same from side-to-side;

a speed and direction element separate from said steering device and actuable by the operator independently of said device for moving the vehicle in forward or reverse and at a selected speed;

a rotatable member shiftable along a predetermined path of travel;

means coupling said element with the member for shifting the latter along said path in response to actuation of said element;

a mechanical drive coupling said steering device with the member for rotating the latter when said steering device is turned;

control means engaging said drive between said steering device and the member for preventing rotation of the member in response to actuation of said element and for preventing shifting of the member along said path in response to rotation of said steering device; and means connectinng the member with said structures for operating the latter when the member is shifted or rotated.

2. Control mechanism as claimed in claim 1, wherein said element comprises a shiftable lever.

3. Control mechanism as claimed in claim 1, wherein said structures are coupled to said member on opposite sides of the axis of rotation of the member.

4. Control mechanism as claimed in claim 1, wherein said member is mounted for swinging movement along said path of travel and has an arcuate periphery, said drive being flexible and being disposed about said periphery, said control means including a second member having an arcuate periphery of substantially the same radius as the periphery of the first-mentioned member and entrained by said drive.

5. Control mechanism as claimed in claim 4, wherein said device is provided with a component of reduced radius relative to said members and entrained by said drive, said second member being disposed between said component and said first member.

6. Control mechanism as claimed in claim 4, wherein the axis of swinging movement of said first member and the center axis of said second member coincide.

7. Control mechanism as claimed in claim 1, wherein is provided a yieldable connection between said member and said element, said connection being operable when the element is at one limit of its travel to permit turning of the vehicle without retracting the element from said limit.

8. In a vehicle having a pair of ground wheels, each provided with a prime mover for driving the same at various speeds, each prime mover having structure for controlling the same, the improvement of which comprises mechanism for actuating said structures, said mechanism including:

an operator-actuated steering wheel shaft limited to rotational movement;

an operator-actuated lever separate from said shaft and limited to swinging movement;

a coupling assembly common to the shaft and the lever having a rotatable member mounted for swinging movement;

a mechanical drive connecting the shaft with said member for oscillating the latter during oscillation of the shaft;

means connecting the lever to the member for swinging the latter during swinging of the lever;

control means engaging said drive between said steering shaft and the member for preventing rotation of the member in response to swinging of the lever and for preventing swinging of the member in response to oscillation of said steering shaft; and means connecting the member with said structures for guiding the vehicle during oscillation of the member and for varying the speed of travel of the vehicle during swinging of the member.

9. In a vehicle having a pair of wheels, a hydraulic motor for driving each wheel respectively, and a variable displacement pump for each motor respectively, each pump having shiftable actuating structure for increasing or decreasing the flow of fluid to its motor in either of two opposite directions, control mechanism for said structures comprising:

a steering device actuatable by the operator of the vehicle for turning the same from side-to-side;

a speed and direction element separate from said steering device and actuable by the operator independently of said device for moving the vehicle in forward or reverse and at a selected speed; and a control assembly coupling said element and said device with said structures for shifting the structures simultaneously in the same direction when said element is actuated whereby to accomplish speed and direction control, and for shifting the structures simultaneously in opposite directions when said device is actuated whereby to accomplish steering control, said assembly including a common operating member for said structures, said device being operable to rotate said member and said element being operable to shift the member and its axis of rotation along a predetermined path of travel, said assembly further including means rendering said member shiftable by said element without influencing the rotation thereof by said device, said member being mounted for swinging movement along said path of travel, having an arcuate periphery, and being provided with a flexible drive about said periphery operably coupling the member with said device, said means including a second member having an arcuate periphery of substantially the same radius as the periphery of the first-mentioned member and entrained by said drive.

10. Control mechanism as claimed in claim 9, wherein said device is provided with a component of reduced radius relative to said members and entrained by said drive, said second member being disposed between said component and said first member.

11. Control mechanism as claimed in claim 10, wherein the axis of swinging movement of said first member and the center axis of said second member coincide.

12. In a vehicle having a pair of wheels, a hydraulic motor for driving each wheel respectively, and a variable displacement pump for each motor respectively, each pump having shiftable actuating structure for increasing or decreasing the flow of fluid to its motor in either of two opposite directions, control mechanism for said structures comprising:

a steering device actuable by the operator of the vehicle for turning the same from side-to-side;

a speed and direction element separate from said steering device and actuable by the operator independently of said device for moving the vehicle in forward or reverse and at a selected speed;

a control assembly coupling said element and said device with said structures for shifting the structures simultaneously in the same direction when said element is actuated whereby to accomplish speed and direction control, and for shifting the structures simultaneously in opposite directions when said device is actuated whereby to accomplish steering control;

said assembly including a common operating member for said structures, said device being operable to rotate said member and said element being operable to shift the member and its axis of rotation along a predetermined path of travel, said member and said element having a yieldable connection therebetween, said connection being operable when the element is at one limit of its travel to permit turning of the vehicle without retracting the element from said limit.

* * * * *